Jan. 31, 1928.

T. R. SHANKS 1,657,770

LEAD ADJUSTMENT FOR RADIAL VALVE GEARS

Filed July 5, 1922

INVENTOR.
THOMAS R. SHANKS
BY Joseph B. Gardner
ATTORNEY.

Patented Jan. 31, 1928.

1,657,770

UNITED STATES PATENT OFFICE.

THOMAS R. SHANKS, OF RICHMOND, CALIFORNIA.

LEAD ADJUSTMENT FOR RADIAL VALVE GEARS.

Application filed July 5, 1922. Serial No. 572,893.

My invention relates to means for controlling the distribution of steam to a steam engine cylinder.

An object of the invention is to provide an apparatus for readily adjusting the travel of a slide or piston valve of a steam engine, particularly when the valve is operated by radial valve gear.

Another object of the invention is to provide controlling means of the character described, which may be readily adjusted from the driver's cab or other suitable place while the engine is in operation.

A further object of the invention is to provide a device of the character described which can be easily attached to practically any valve gear using a combination lever for operating the valve.

The invention possesses other objects and features of advantage, some of which, with the foregoing, will be set forth in the following description of the preferred form of the invention which is illustrated in the drawings accompanying and forming part of the specification. It is to be understood that I do not limit myself to the showing made by said drawings and description, as I may adopt variations of the preferred form within the scope of my invention.

Figure 1:
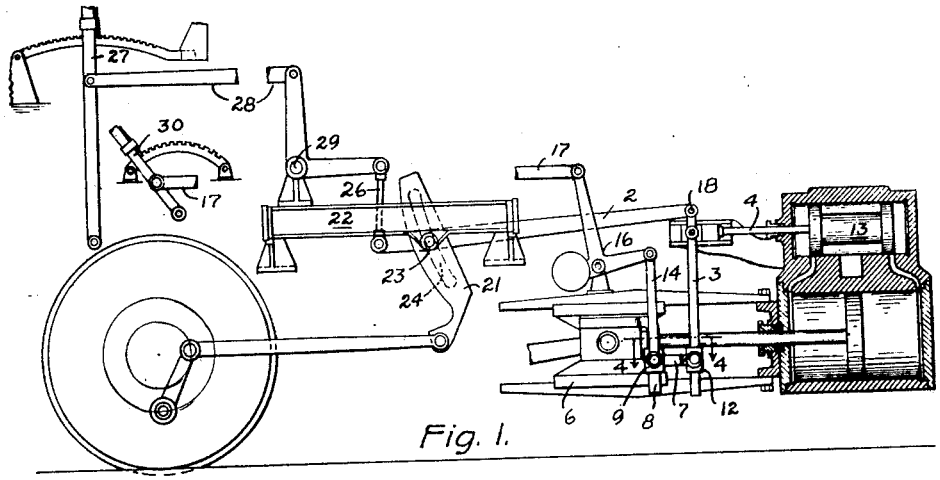
Figure 1 is a diagrammatic side elevation, partly in section, showing the device operatively associated with the valve controlling mechanism of a locomotive engine, and with the valve in mid-position.
Figure 2:
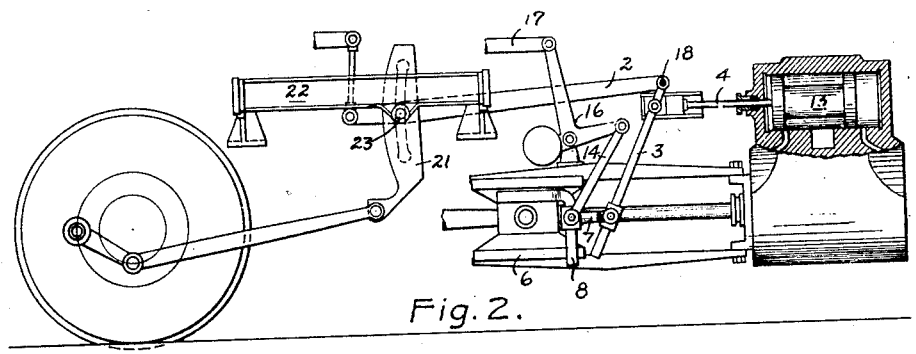
Figures 2 and 3 are views similar to Figure 1, but with the crank pin in its different dead-center positions.

Briefly expressed the apparatus in the present form of the invention comprises a guide member which is attached to the cross-head or other suitable reciprocating part of the engine. Slidably mounted on said guide member and the combination lever of the valve gear is a link which transmits the motion from the guide-member to said lever. By adjusting said link up or down the guide-member and lever, the ratio of the valve rod and the radius-rod of the valve gear, with respect to the valve-rod and link will be varied, thereby causing the position of the slide-valve to be proportionately changed. In this manner when the piston is at the end of the stroke the lead of the valve in relation thereto will be increased or decreased according to the direction in which the foresaid link has been moved.

A detailed description of the illustrated form of the invention follows:

The means of my invention as heretofore stated, is particularly adapted for use in connection with the radial type of valve gear. This type includes as here shown, the radius-rod 2 which is connected by means of the combination-lever 3 to the valve-rod 4 of the steam-distributing or slide-valve of the engine, the lever 3 being also usually connected by a link to the cross-head 6 or other suitable reciprocating part of the engine. As here shown the mode of connection of the combination lever and the cross-head is by a link 7 which is adjustably secured to said lever and to a guide member 8 fixed to the cross head. One end of the link is provided with a suitable bearing 9 which slides on said guide, whereas, the other end 10 is forked or otherwise formed for pivotally carrying a bearing 12 which is slidably mounted on the combination lever.

It will now be noted that the arm of the bell crank lever which pivotally carries the link 14 is disposed in generally perpendicular relation to the link and is otherwise so related thereto that no appreciable shift of the common pivot point of the lever arm and link 14 in a direction longitudinal of the engine can occur between different adjusted positions of the link in the guideway.

In the present showing, the radius rod 2 and valve rod 4 are connected to the combination lever for effecting the operation of a valve 13 of the inside admission type.

Figure 3:
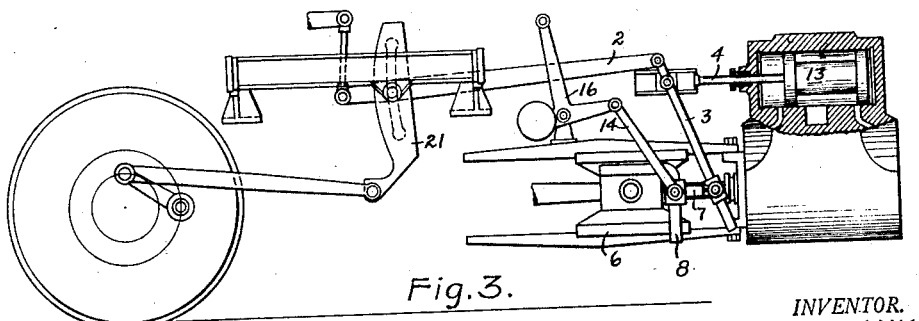
Figure 4:
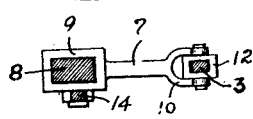
Figure 4 is an enlarged fragmentary view taken on the line 4—4 in Figure 2.

As illustrated in Figure 3, the radius rod 2 is arranged to be reciprocated by means of a reverse link 21 of the usual type pivotally mounted on the engine frame 22, a slide bearing 23 carried on the radius rod being arranged to be variously positioned in the slot 24 of the link at the will of the engineer. As here shown, the radius rod is held in desired relation to the link 21 by means of a lift link 26 pivotally secured thereto and arranged to be actuated through a link 28 and reverse shaft 29 by means of the usual engineer's reverse lever 27 positioned in the cab.

It will now be noted that if the equality of leads of the valve from its mid-stroke is to be maintained, the combination lever 3 must always be disposed in the same angular relation to the valve rod at mid-stroke, and that any adjustments provided for in its connections with the radius rod, valve rod, or cross-head must not effect such symmetry of movement of the valve. Accordingly, the guideway provided by the guide member 8 is so disposed that the link 7 will be guided to move therealong in a direction parallel to that of the lever at mid-stroke, while the link itself is of such length that the guideway and lever will be parallel when mid-stroke position of the lever is reached. In this manner, shifting of the link along the guideway will not effect the equality of valve leads at the stroke ends thereof, and yet may be utilized in varying the amount of lead.

Means are provided for enabling the operator to change the position of the link 7 while the engine is in operation. As shown in the present embodiment of the invention said link is connected by means of a lifter-link 14 to a counter-balanced bell-crank lever 16. The latter may be moved and held in any desired position by a suitable rod 17 which is here shown arranged to be actuated by a lever 30 positioned in the engineer's cab.

The operation of the device is as follows:

Assuming the piston to be at the back end of the stroke, it will be seen by referring to the drawings that by depressing the link 7 the combination lever 3 will be moved to the right. The upper end of the combination lever being pivotally attached to the radius-rod such as by a pin 18, the latter will act as a fulcrum point thereby causing the valve-rod and valve to be moved to the right, with the result that the travel of the valve will be decreased. Thus if a direct acting valve of the "D" type is used the lead will be increased and the point of cut-off retarded; and on the other hand if an indirect valve is used, such as a piston valve 13 taking the steam at the center as is here shown, the lead will be decreased and the cut-off correspondingly advanced.

As hereinbefore noted the travel of the valve can be varied while the engine is in operation, as the effect of moving the link 7 will be the same at any point of the stroke. Thus when the engine is being started against a heavy load, the operator may raise the link 7; this will cause the travel of the valve to be increased, the lead decreased and the point of cut off retarded. As the engine picks up the load and the speed increases, the operator may then shift the link to a position which is found to give the correct point of cut-off and cushioning effect for the particular speed at which the engine is running. At high rotative speeds of the engine the valve may have a large amount of lead and an early cut-off, producing therefor ideal conditions for economy and smooth running.

I claim:

1. In a valve gear for adjusting the lead of the slide-valve, a reciprocating member, a combination lever, and a link slidably engaging said member and lever for adjustably connecting said member and lever together.

2. In a valve gear for adjusting the lead of the slide-valve, a reciprocating guide, a radius rod, a valve rod, a combination lever, a link slidably attached to aforesaid guide and slidably and pivotally attached to said combination lever, and means varying the ratio of lengths between the radius-rod and valve-rod and between the said slidable link and valve-rod.

3. In a device of the character described, a reciprocating member, a combination lever, a valve rod pivotally secured to said lever, and a link slidably mounted on and connecting said reciprocating member and said combination lever to define a movable fulcrum on said lever whereby the ratio of lengths of the effective lever arms with respect to said fulcrum may be varied.

4. In a device of the character described, a reciprocating member, a valve rod, a combination lever operatively connecting said member and valve rod, and a link slidably attached to said reciproacting member and slidably and pivotally attached to the combination lever to define a movable fulcrum on said lever whereby the length of stroke of the valve rod may be changed upon the movement of said link to move said fulcrum along said lever.

5. In a device of the character described, a radius rod, a valve rod, a reciprocating member, a combination lever pivotally fixed to said radius rod and valve rod, and a link slidably mounted on said member for movement transversely of the line of motion thereof and in fixed angular relation thereto and slidably and pivotally engaging said lever to define a movable fulcrum thereof whereby the ratio of lengths of the effective lever arms with respect to said fulcrum may be varied.

6. In a valve gear for adjusting the lead of a distributing valve, a reciprocating member, a combination lever, a link slidably engaging said member and lever to operatively connect the same, and means operative to variably position said link along said lever during the operation of the gear.

7. In a valve gear for adjusting the lead of a distributing valve, a reciprocating member, a combination lever, a link slidably engaging said member and lever, said link being arranged to be maintained in fixed angular relation to said member and to define a fulcrum movable along said lever, and means operative to support said link in a plurality of adjusted positions.

8. In a valve gear for adjusting the lead of a slide valve, a valve rod, a combination lever, a reciprocating member providing a guideway disposed in parallel relation to the midstroke position of said lever, a link slidably engaging said guideway and slidably and pivotally engaging said lever to define a fulcrum movable therealong, said lever being arranged to be disposed parallel to said guideway at the mid-stroke of said valve, and means operative to adjustably position said link along said guideway.

In testimony whereof, I have hereunto set my hand at Oakland, this 28th day of June 1922.

THOMAS R. SHANKS.